United States Patent [19]

Augustine et al.

[11] Patent Number: 4,859,477

[45] Date of Patent: Aug. 22, 1989

[54] PRESWEETENED COMESTIBLE COMPOSITION

[75] Inventors: Michael E. Augustine, Decatur, Ill.; Frank T. Orthoefer, Lafayette, La.

[73] Assignee: A. E. Staley Manufacturing Company, Decatur, Ill.

[21] Appl. No.: 113,383

[22] Filed: Oct. 22, 1987

Related U.S. Application Data

[63] Continuation of Ser. No. 887,678, Jul. 18, 1986, abandoned.

[51] Int. Cl.$^4$ ................................................ A23L 1/10
[52] U.S. Cl. .................................... 426/103; 426/302; 426/497; 426/620
[58] Field of Search .................... 426/94, 96, 103, 302, 426/455, 496, 497, 506, 620, 621, 625, 446, 449

[56] References Cited

U.S. PATENT DOCUMENTS

| | | | |
|---|---|---|---|
| 3,527,646 | 9/1970 | Schuck et al. | 426/289 |
| 3,784,716 | 1/1974 | Spangler | 426/289 |
| 4,089,984 | 5/1978 | Gilbertson | 426/293 |
| 4,101,680 | 7/1978 | Edwards | 426/302 |
| 4,338,339 | 7/1982 | Edwards | 426/291 |
| 4,379,171 | 4/1983 | Furda et al. | 426/620 |
| 4,465,702 | 8/1984 | Eastman et al. | 426/579 |
| 4,499,113 | 2/1985 | Mochizuki et al. | 426/103 |
| 4,501,758 | 2/1985 | Morris | 426/93 |
| 4,518,622 | 5/1985 | Wilson et al. | 426/578 |
| 4,676,991 | 6/1987 | Batterman | 426/590 |
| 4,692,342 | 9/1987 | Gannis et al. | 426/293 |
| 4,702,925 | 10/1987 | Verrico | 426/96 |
| 4,737,368 | 4/1988 | Batterman | 426/96 |

FOREIGN PATENT DOCUMENTS 1328608 8/1973 Canada.

OTHER PUBLICATIONS

An abstract in European Patent Reports, Week 8725 (Derwent Publ. Ltd. 1987) of European Patent Publication 308882, published Nov. 13, 1986.

*Primary Examiner*—Donald E. Czaja
*Assistant Examiner*—Carolyn Paden
*Attorney, Agent, or Firm*—Michael F. Campbell; J. Daniel Wood

[57] ABSTRACT

Disclosed are comestibles, especially ready-to-eat cereals, that are coated with a sweetener and a cold-water-swelling granular starch. A preferred method of preparation comprises: (a) providing a base of dried food pieces; (b) dampening comestible with an aqueous medium; (c) coating dampened coated comestible with substantially dry sweetener cold-water-swelling granular starch and (d) drying the coated comestible.

1 Claim, No Drawings

PRESWEETENED COMESTIBLE COMPOSITION

This application is a continuation of Ser. No. 887,678, filed July 18, 1986.

BACKGROUND OF THE INVENTION

The present invention relates to food products, and more particularly, to presweetened ready-to-eat comestibles such as breakfast cereals and to processes for the preparation thereof.

Presweetened breakfast cereals have been available for many years. Such cereals have been prepared by first producing unsweetened cereal pieces, particularly puffed cereal pieces, coating the cereal pieces with a slurry or solution of sweeteners and then drying the coated pieces in an oven or air current.

Generally, the primary sweetener for presweetened cereals has been nutritive carbohydrate sweeteners such as sucrose, fructose, corn syrups, etc. Sucrose solutions employed frequently contain various levels of regular [e.g., 42 Dextrose Equivalent (D.E.)] corn syrup to provide upon drying coatings which are either desirably clear or frosted.

While the foregoing carbohydrate sweeteners are effective to sweeten cereals, attempts have recently been made to reduce the sucrose and/or total sugars content of presweetened cereals. To provide traditional levels of sweetness at reduced concentrations, sweeteners having more sweetening power per unit weight than sucrose (i.e., having higher relative sweetness) must be employed.

Since fructose is 10%–70% sweeter than sucrose, art attempts have been made to employ fructose as a sweetening agent for ready-to-eat cereals. Fructose is commercially available in basically two forms, (1) high fructose corn syrup, (hereinafter "HFCS") normally a liquid, (20% moisture) and (2) crystalline fructose which is a solid powder.

High fructose corn syrup has the advantage of being relatively inexpensive compared to crystalline fructose. Employment of HFCS as the principal component of coating for presweetened cereals, however, suffers from several disadvantages. First, coating cereals with HFCS result in a sticky, messy product which at best is extremely difficult to dehydrate to a solid, non-adhesive state.

U.S. Pat. No. 4,089,984 issued May 16, 1978 to Gilbertson utilizes a process for coating cereal by applying a coating of hot liquid sweetener such as fructose, maltose, dextroses and mixtures thereof to cereal pieces and then applying a powdered edible material such as sucrose, lactose, corn syrup solids, corn starch, wheat starch, dextrose, protein or wheat germ. This process is an attempt to eliminate the stickiness problem.

Another problem with HFCS is that it is not as sweet as crystalline fructose. Fructose exists mostly in four forms as the alpha-furano, beta-furano, alpha-pyrano and beta-pyrano structures. The sweetness perception of fructose is, however, primarily a function of the amount of the beta-pyrano form. Crystalline fructose, is usually manufactured as theoretically pure anhydrous beta-D-fructopyranose for this reason (although typical analyses indicate only 97.2% beta-pyranose). HFCS, on the other hand, is not as sweet as pure crystalline fructose since it is an amorphous mixture of these less sweet fructose forms as well as the sweeter form and it contains glucose which is also less sweet. HFCS comprises only about 57–70% of the sweet beta-pyrano form (based on total fructose). Therefore, crystalline fructose is substantially sweeter on a unit weight basis than HFCS (dry basis).

U.S. Pat. No. 4,379,171 issued Apr. 5, 1983 to Furda discloses a method combining crystalline fructose of a particular particle size and HFCS seeded with powdered crystalline fructose, in a certain weight range ratio, with the result that the less sweet forms of HFCS can be converted in situ into the more sweet form. This method involves the steps, in sequence, of (a) providing a base of dried food pieces; (b) coating with a HFCS seeded with powdered crystalline fructose; (c) coating with a dry, solid, powdered crystalline fructose; (d) enrobing with a heated edible oil; and (e) dusting with a dry powdered sugar to form the finished sugar coated food products.

Art attempts to provide cereals coated with the high intensity sweetener aspartame include U.S. Pat. No. 3,955,000 issued May 4, 1976 to Baggerly. Aspartame was admixed in aqueous suspension with relatively high concentrations of water soluble dextrins. Atomization is used to evenly apply the suspension to the cereal base. A similar technique is disclosed in U.S. Pat. No. 4,079,151 issued Mar. 14, 1978. There, however, maltodextrin was substituted for the hydrolyzed dextrins in the aqueous dispersion so as to provide a coating which upon drying provides a frosted appearance as opposed to the glassy appearance taught as resulting from the methods of the '000 patent. The '151 patent also teaches the necessity of spraying the suspension with successive applications in order to produce a frosted appearance.

U.S. Pat. No. 4,378,377 issued Mar. 29, 1983 to Gajewski describes using a water soluble vegetable protein isolate as a adhesive to attach aspartame to the cereal pieces. Similarly, U.S. Pat. No. 4,540,587 issued Sept. 10, 1985 and issued to Gajewski describes using water soluble gums to help adhere the aspartame to the cereal pieces.

It is an object of this invention to provide a presweetened ready-to-eat comestible, preferably cereal, that is sweetened with nutritive sweeteners such as fructose, dextrose and sucrose and mixtures thereof. It has been found that certain cold-water-swelling granular starches are surprisingly useful in coating sweeteners on comestibles.

Throughout the specification and claims, percentages and ratios are by weight, and temperatures are in degrees Celsius, unless otherwise noted.

SUMMARY OF THE INVENTION

The present invention relates to sweetened, dry comestibles, particularly ready-to-eat (RTE) cereals, comprising:

(a) a coating comprising from about 10% to about 60% of the total weight of the coated comestible, said coating comprising, on a coating only basis, from about 5% to about 50% of a cold-water-swelling granular starch and from about 50% to about 95% of a saccharide based sweetener; and (b) a dry comestible comprising from about 40% to about 90% of the total weight of the coated comestible, said comestible comprising discrete particles of food.

In its method aspect, the present invention relates to a process for coating a dry comestible with a sweetener, comprising the steps of:

(a) providing pieces of a dry comestible.

(b) dampening the comestible pieces with an aqueous medium to form dampened comestible pieces;
(c) coating said dampened comestible pieces with said blend of dry sweetener and cold-water-soluble granular starch; and
(d) drying said coated comestible to less than about 5% moisture.

DETAILED DESCRIPTION OF THE INVENTION

The present invention relates to sweetened comestibles and method for preparation of such products. The present invention is particularly suited to coatings for ready-to-eat presweetened cereals, snack foods, nuts and any other sweetened food product that is a dry discrete particle having coating of a sweetening material on the surface thereof.

In one preferred embodiment, the process of this invention comprises the steps (a) providing pieces of a dried comestible; (b) preparing a coating comprising sweetener, cold-water-soluble granular starch and water; (c) coating comestible with said coating; and (d) drying the coated comestible. In a particularly preferred process, the water and some of the sweetener for the coating is provided by a sweetener syrup.

It is also contemplated that the comestible piece may be premoistened with water or sweetener syrup prior to application of the coating and that, in that embodiment the coating composition can be applied in substantially dry form. The process of that particular embodiment thus comprises the steps (a) providing pieces of a dried comestible; (b) dampening said comestible with an aqueous medium; (c) coating the dampened comestible with substantially dry sweetener and cold-water-soluble granular starch; and (d) drying the coated comestible. The various steps in the preparation are described in detail below.

A. Providing a Base of Dried Food Pieces

The present methods of preparation comprise the step of providing a base of dried food pieces. The food pieces can be of any food type which is desired to be provided with a sweetened coating and include, for example, puffed popcorn or other grains, nuts, candies, and the like. The present methods find particular utility in providing ready-to-eat cereals with a presweetened coating. In the following detailed description of the present invention, even though particular reference is made to a base comprising R-T-E cereals, it is understood that the present invention also finds application in other food areas. The cereal pieces can be of any geometric configuration or form including, for example, flakes or puffs, or the like. The present invention finds particular utility in the coating of puffed cereals.

Any conventional puffed cereal or method of preparation can be used herein to provide a puffed cereal base. The art is replete with such compositions and their methods of preparation and the skilled artisan will have no problem selecting suitable compositions or methods or preparation.

For those food products requiring low moisture contents, it is important that any drying operation is performed prior to the coating of the comestible. Typically, for example, puffed cereal bases must be dried to relatively low mositure contents in order to have the desired crispness or friability. Thus, when a puffed cereal is the food base in the present methods of preparation, it is desired to dry the puffed cereal base pieces to a moisture content of less than about 5%, and preferably less than about 4%, prior to the application of water or the sweetener syrup.

Any conventional drying technique can be used to reduce the moisture content of the cereal base pieces. The drying can be accomplished using equipment such as a rotary bed, tray, or belt driers. Simple hot air convection drying, e.g., 40° C. to 82° C., is generally the presently preferred technique for cereal piece drying.

B. Preparation of the Surface of the Comestible for Coating

After the comestible piece is obtained, it is then prepared for coating by any of several means. The comestible piece is prepared for coating by dampening with an aqueous medium. The aqueous medium may be water or a sweetener syrup. In one aspect, the comestible piece is pre-moistened with water in an amount sufficient to adhere the sweetener and cold-water-soluble starch coating blend that will be added later. In a preferred method using water to premoisten the comestible, water is sprayed onto the comestible by weight of the comestible at a level of from about 5% to about 30% water.

A second, and especially preferred, means of preparing the surface of the comestible for coating is to coat or enrobe the dried food piece or comestible with a sweetener syrup. The sweetener syrup contains at least about 60%, preferably above about 70% sweetener solids and less than about 85% sweetener solids preferably less than about 80% sweetener solids. The sweetener in the syrup can be any saccharide based sweetener such as fructose, sucrose, dextrose or mixtures thereof. However, a fructose based sweetener is the preferred sweetener syrup. The syrup may be prepared by dissolving crystalline fructose sweetener in water or by using 42% or 55% (dry solids basis, dsb) high fructose corn syrup. A preferred syrup is 90% (dsb) high fructose corn syrup. The sweetener syrup dry solids contain at least about 90% preferably above about 95% monosaccharides.

When fructose is used as the sweetener syrup, it is preferred the syrup mixture be seeded with from about 1 to about 10% dry, crystalline fructose per part sweetener syrup (dry basis). The preferred level is about 3–8%. The preferred seed is dry fructose and the most preferred seed is dry, crystalline fructose.

When 42% fructose containing high fructose corn syrup (HFCS) is used as the sweetener syrup, the final seeded syrup will contain at least about 42% fructose (dsb). A preferred embodiment is to use 55% HFCS as the sweetener syrup; in this case, the seeded syrup will contain at least about 55% fructose (dsb). In a more preferred embodiment, 90% HFCS is used as the sweetener syrup, in this instance, the seeded syrup will contain at least 90% fructose (dsb). In a most preferred embodiment, a 90% HFCS syrup is seeded with at least about 3% crystalline fructose which results in a seeded syrup containing at least about 93% fructose (dsb). All of the above percentages are on a dry solids basis.

The sweetener syrup or water (aqueous medium) is then applied to pieces of the comestible material. The weight ratio of comestible material to syrup or water ranges from about 20:1 to 3:1, preferably in the range of from about 8:1 to 4:1.

The sweetener syrup may be applied to the comestible pieces by using any conventional enrobing technique such as an enrober drum. The sweetener syrup may be at a temperature of between about 35° C. to 100° C., and preferably between 80° C. and 100° C.

C. Coating the Comestible

Another step of the invention is to coat the dampened comestible with dry sweetener and cold-water-swelling granular starch. A preferred embodiment is to prepare a coating blend comprised of dry sweetener and cold-water-swelling/soluble granular starch.

The substantially dry sweetener used in the coating or blend include various saccharide sweeteners such as sucrose, fructose, dextrose and the like, either alone or in combination, and non-nutritive sweeteners such as aspartame, saccharin and the like. Combinations of saccharide and non-nutritive sweeteners may be used in the coating blend. When using a non-nutritive or high intensity sweetner, it is possible to reduce the level or eliminate the saccharide sweetener from the coating. The cold-water-swelling granular starch can be used to adhere high intensity sweeteners such as aspartame to a dampened comestible. One preferred embodiment of this invention is to use dry fructose as the sweetener. An especially preferred embodiment is to use crystalline fructose as the sweetener in the coating blend.

In a preferred embodiment of the present invention, it is also desirable that the applied dry sweetener be powdered. The particle size range of the sweetener preferably ranges from about 15 to 250 microns.

An advantage of being within the above-given powdered sweetener particle size range is that the sugar coated pieces lose less of their sugar coating upon handling, i.e., exhibit lower sugar losses. Still another advantage of employing powdered sweetener of the given particle size is that greater amounts of sweetener are able to be coated onto the cereal piece per given surface area. Large granulation sweetener can result in unevenly coated cereal pieces exhibiting a blotched coating. Also, while the precise phenomenon is not understood, the sweetness perception for a given level of sweetener, appears to drop off with either too large a particle size or too small a particle size. When too fine a particle size sweetener is employed, poor adherency is encountered during processing. Suitably sized powdered sweetener is commercially available. Powdered sweetener having a particle size within the above-given range can also be prepared from simple screening of other commercial sweetener materials. Higher particle size fractions can then be milled and sieved to prepare suitably sized powdered sweetener. Minor amounts, i.e., a few percent, of under or over-sized sweetener particles can be tolerated without departing from the advantages of the present invention.

A key element of this invention is the discovery that cold-water-swelling/soluble granular starches are effective in adhering the dry sweetener to the comestible particles and in maintaining the freshness of the sweetened comestible.

The cold-water-swelling granular starch material is derived from ungelatinized starch and consists essentially of substantially intact, partially swollen granules which appear nonbirefringent when viewed under a polarizing microscope. The starch may or may not be chemically modified. The preferred starch, derived from corn, is not chemically modified. It is further characterized by a cold-water solubility of at least 50% and, where the ungelatinized corn starch starting material for the starch is not modified chemically or minimally modified, by an ability to set, without cooking or chilling, to a resilient, cleanly sliceable gel when blended with an aqueous sugar syrup. The cold-water-swelling-/cold-water-soluble starch material is prepared by forming a slurry of granular ungelatinized corn starch in a liquid medium comprised of water and either ethanol, denatured ethanol, propanol or isopropanol; and heating said slurry to a temperature of about 148° C. to about 182° C. at or above autogenic pressure for about 0.5 to about 30 minutes. The cold-water-swelling granular starch material is then separated from the processing medium by filtration, centrifugation, decantation and like means.

Cold-water solubility as used in characterizing the cold-water-swelling granular starch material is determined by mixing a known weight of starch in a measured volume of distilled water with a Waring blender, centrifuging the starch suspension and weighing the residue obtained by evaporation of a measured aliquot of the supernatant liquid. The water solubility of the starch sample is expressed as % solubles, dry substance basis (dsb). Details are provided in U.S. Pat. No. 4,465,702 issued Aug. 14, 1984 to Eastman and which is incorporated by reference.

Starches possessing the above described characteristics are commercially available. One particularly preferred starch of this type is a corn starch manufactured by A. E. Staley Manufacturing Company, Decatur, Ill. under the designation Mira-Gel TM 463.

The ratio of dry sweetener to cold-water-soluble granular starch in the coating blend is between about 19:1 to 1:1, preferably 10:1 to 1:1, most preferably 6:1 to 2:1. The coating blend ingredients can be dry blended in any conventional fashion.

After the comestible piece is dampened with an aqueous medium, water or sweetener syrup, it is coated with the above described dry sweetener and cold-water-swelling granular starch, either separately or in a blend to cover the surface of the comestible piece. The weight ratio of the comestible base (ignoring any sweetener pre-coating weight) to coating blend ranges from about 9:1 to about 1:1, preferably from about 5:1 to 2:1. It is important to uniformly coat the surface of the comestible piece with the dry sweetener and cold-water-soluble granular starch coating blend. The coating blend adheres to the dampened comestible piece and forms a barrier coating.

A conventional application apparatus can be employed to apply the coating blend to the surface of the comestible pieces. For example, when the coating blend is in substantially dry form, it can be dusted onto the comestible pieces while they are being tumbled in an enrober.

D. Drying the Coated Comestible

After the comestible piece is dampened with an aqueous medium and coated with the sweetener starch coating, it is dried to less than about 5% moisture.

Any conventional drying technique can be used to reduce the moisture content of the coated comestible pieces. The drying can be accomplished using equipment such as a rotary bed, tray, or belt driers. Simple hot air convection drying, e.g., 40° C. to 82° C., is the preferred technique.

The sweetened dry comestible of this invention has a composition comprising a coating and a dry comestible piece. The coating comprises from about 10% to about 60% of the total weight of the coated comestible and the dry comestible pieces comprise from about 40% to about 90% of the total weight of the coated comestible. The coating is comprised of from about 5% to about 50%, preferably from about 10% to about 40%, and most preferably from about 10% to about 30% of a cold water swelling granular starch. The characteristics of the starch have been described above. The coating also is comprised of from about 50% to about 95%, preferably from about 60% to about 90% and most preferably from about 70% to about 85% of a saccharide based sweetener.

In a preferred embodiment when fructose is used as the sweetener, the fructose content of the saccharide sweetener in the coating comprises at least about 85% (dsb) of the sweetener when 42% HFCS is used as the coating syrup. Glucose is the other significant saccharide present in such case. In an especially preferred embodiment, 55% HFCS is used and the fructose content of the sweetener portion of the coating is at least about 87% (dsb). In the most preferred embodiment, 90% (dsb) HFCS is used and the fructose content of the sweetener portion of the coating is at least about 95%. When HFCS is used as a sweetener syrup, substantial amounts of dextrose (glucose) are present in the sweetener syrup. The coating may also optionally include high intensity sweeteners such as aspartame, saccharin and the like. Coloring agents, flavoring agents, vitamins, minerals and similar ingredients may be included in the coating.

The dry comestible pieces of food that are coated with the above coating composition can be any dry, discrete particle of food material which is desired to be provided with a sweetened coating. Examples of dry comestible pieces include nuts, candies, ready-to-eat cereals, puffed popcorn and other grains and the like. Ready-to-eat cereal represent a particularly preferred form of comestibles on the present invention.

The following examples are provided to more fully illustrate the above discussed embodiments of the present invention. The following examples are not intended to limit the invention disclosed herein.

EXAMPLE I

Presweetened cereal of the present invention was prepared by using 163.1 g. Cheerios ® ready-to-eat cereal. The moisture content of the Cheerios was about 4.5%. A seeded fructose syrup was prepared adding 1.63 g. crystalline fructose to 32.66 g. fructose syrup (96% fructose (dsb) and 71% dry solids). The seeded fructose syrup was sprayed onto the Cheerios cereal in a rotating enrobing drum. The syrup coated cereal pieces were then dusted in the rotating drum with a coating blend comprised of 50.33 g. crystalline fructose and 16.3 g. Mira-Gel ™ 463 starch (A. E. Staley Manufacturing Company, Decatur, Ill.). The resulting sweetener-starch coated, syrup coated cereal pieces were then dried in a tray dryer at 44° C. for 15 minutes. The moisture content of the dried presweetened cereal was 3.8%. The presweetened cereal was not sticky and had good handling properties.

EXAMPLE II

A presweetened cereal was prepared in the same manner as Example I except that crystalline sucrose was used instead of crystalline fructose. The sucrose syrup was prepared by making a 71% dry solids syrup from sucrose. The sucrose syrup (34.96 g.) was sprayed onto 163.1 g. Cheerios ® ready-to-eat cereal in a rotating enrobing drum. The syrup coated pieces were then dusted in the rotating drum with a coating blend comprised of 50.33 g. granulated sucrose and 16.3 g. Mira-Gel ™ 463 starch. The sucrose-starch coated syrup coated cereal pieces were then dried in a tray dryer at 44° C. for 15 minutes. The moisture content of the dried presweetened cereal was 3.5%. An excellent, non-sticky presweetened cereal was obtained.

EXAMPLE III

The presweetened cereals prepared in Examples I and II were evaluated for shelf life. In one series of evaluations, commercial cereal products (uncoated Cheerios and a presweetened cereal, Cinnamon Toast Crunch ™ manufactured by General Mills, Inc.) and test cereals were stored at room temperature (approximately 22° C.) and at room humidity (30–50% Relative Humidity) for eight weeks in closed cereal boxes to determine moisture changes in the cereals. The results are shown in Table I.

TABLE I

| Test Cereal | % Moisture at | | |
|---|---|---|---|
| | 0 Weeks | 4 Weeks | 8 Weeks |
| 1. Uncoated Cheerios | 4.5 | 5.0 | 5.0 |
| 2. Cinnamon Toast Crunch (Commercial presweetened) | 2.5 | 2.0 | 1.9 |
| 3. Fructose Coated Cereal of Example I | 3.9 | 4.0 | 3.9 |
| 4. Sucrose Coated Cereal of Example II | 3.5 | 4.0 | 4.5 |

These results show that the fructose coated presweetened cereal using Mira-Gel 463 starch as a binder did not exhibit moisture pick-up during the eight weeks room temperature shelf life test. The sucrose coated material was still acceptable after 8 weeks storage. These four cereals were evaluated for texture by subjective taste panel. The objective was to determine at what point the cereal was stale. Texture scores ranging from 1 to 10, with 10 being best, were given each product at weekly intervals. A texture score of 5 or below was considered to indicate the product was stale. The samples were stored in open cereal boxes for 6 weeks. The results are shown in Table II.

TABLE II

| Test Cereal | Texture Score Week | | | | | | |
|---|---|---|---|---|---|---|---|
| | 0 | 1 | 2 | 3 | 4 | 5 | 6 |
| 1. Cheerios | 8.8 | 7.6 | 7.4 | 6.8 | 5.2 | — | — |
| 2. Fructose Coated Cereal of Example I | 8.0 | 8.0 | 8.2 | 8.8 | 7.0 | 5.0 | 5.2 |
| 3. Sucrose Coated Cereal of Example II | 7.8 | 7.2 | 6.8 | 6.4 | 5.2 | 4.0 | — |

The results show surprisingly that the fructose cold-water-swelling granular starch coated cereal had the best shelf life.

A similar evaluation as performed above was carried out using closed boxes. The results are shown in Table III.

TABLE III

| Test Cereal | Texture score Week | | | | | | | | |
|---|---|---|---|---|---|---|---|---|---|
| | 0 | 1 | 2 | 3 | 4 | 5 | 6 | 7 | 8 |
| 1. Cheerios | 8.4 | 7.0 | 7.4 | 7.4 | 7.0 | 7.8 | 6.4 | 5.0 | 4.6 |
| 2. Fructose Coated Cereal | 8.6 | 8.6 | 8.6 | 8.6 | 8.6 | 8.6 | 8.2 | 8.0 | 7.8 |
| 3. Sucrose Coated Cereal | 8.0 | 6.2 | 6.8 | 6.6 | 6.0 | 5.8 | 6.8 | 5.0 | 4.6 |

Again, the fructose-starch coated cereal showed surprisingly improved shelf life over the sucrose starch coated cereal and the uncoated base cereal.

What is claimed is:

1. A sweetened dry comestible comprising:
   (a) a coating comprising from about 10% to about 60% of the total weight of the coated comestible, said coating comprising, on a coating only weight basis, from about 5% to about 50% of a cold-water-swelling granular starch and from about 50% to about 95% of a saccharide based sweetener, said sweetener having a fructose content of at least 85% by weight (dsb) of said sweetener; and
   (b) a dry comestible comprising from about 40% to about 90% of the total weight of the coated comestible, said comestible comprising discrete particles of ready-to-eat cereal.

* * * * *